(12) United States Patent
Lee et al.

(10) Patent No.: US 10,116,520 B2
(45) Date of Patent: Oct. 30, 2018

(54) APPARATUS AND METHOD FOR GENERATING A NETWORK ON CHIP IN AN ELECTRONIC DEVICE

(71) Applicants: Samsung Electronics Co., Ltd., Gyeonggi-do (KR); Research & Business Foundation Sungkyunkwan University, Gyeonggi-do (KR)

(72) Inventors: Woo-Cheol Lee, Gyeonggi-do (KR); Chang Lin Li, Gyeonggi-do (KR); Tae Hee Han, Gyeonggi-do (KR); Jinwoo Roh, Gyeonggi-do (KR); Dongwook Suh, Gyeonggi-do (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 202 days.

(21) Appl. No.: 15/068,381

(22) Filed: Mar. 11, 2016

(65) Prior Publication Data

US 2016/0269321 A1    Sep. 15, 2016

(30) Foreign Application Priority Data

Mar. 11, 2015 (KR) .......................... 10-2015-0033881

(51) Int. Cl.
*H04L 12/26* (2006.01)
*H04L 12/24* (2006.01)
*H04L 12/773* (2013.01)

(52) U.S. Cl.
CPC ............ *H04L 41/145* (2013.01); *H04L 45/60* (2013.01)

(58) Field of Classification Search
None
See application file for complete search history.

(56) References Cited

U.S. PATENT DOCUMENTS

| | | | |
|---|---|---|---|
| 6,151,568 A | * | 11/2000 | Allen .................. G06F 17/5022 |
| | | | 703/14 |
| 7,701,252 B1 | | 4/2010 | Chow et al. |
| 8,213,298 B2 | | 7/2012 | Yamaguchi et al. |
| 2014/0204740 A1 | | 7/2014 | Tokutsu et al. |

FOREIGN PATENT DOCUMENTS

EP    2 408 154 A1    1/2012

OTHER PUBLICATIONS

Dogan, et al.; "Multi-Core Architecture Design for Ultra-Low-Power Wearable Health Monitoring Systems"; Conf. on Design, Automation & Test in Europe; Mar. 12, 2012; 6 pages.
Seiculescu, et al.; "NoC Topology Synthesis for Supporting Shutdown of Voltage Islands in SoCs"; Design Automation Conf.; Jul. 26, 2009; 4 pages.

(Continued)

*Primary Examiner* — Ayaz R Sheikh
*Assistant Examiner* — Tarell A Hampton

(57) ABSTRACT

According to an exemplary embodiment of the present disclosure, a method of generating a network-on-chip (NoC) in an electronic device includes clustering a plurality of cores based on total communication energy comprising first communication energy between a plurality of voltage-frequency-islands (VFIs) and second communication energy inside the plurality of VFIs.

16 Claims, 8 Drawing Sheets

(56) References Cited

OTHER PUBLICATIONS

Marcuescu, et al.; "OUtstanding Research Problems in NoC Design: System Microarchitecture and Circuit Perspectives"; CADIC; Jan. 28, 2009; 19 pages.

Kim, et al.; "A 1.22TOPS and 1.52mW-MHZ Augmented Reality Multi-Core Processor with Neural Network NoC for HMD Applications"; IEEE Solid-State Circuits; Jan. 2014; 3 pages.

Dongkun Shin, et al., "Communication-aware VFI Partitioning for GALS-based Networks-On-Chip", School of Information and Communication Engineering, Sungkyungkwan University, 2011, 21 pages.

* cited by examiner

APPARATUS AND METHOD FOR GENERATING A NETWORK ON CHIP IN AN ELECTRONIC DEVICE

CROSS-REFERENCE TO RELATED APPLICATION AND CLAIM OF PRIORITY

The present application is related to and claims benefit under 35 U.S.C. § 119(a) of a Korean patent application filed in the Korean Intellectual Property Office on Mar. 11, 2015 and assigned Serial No. 10-2015-0033881, the entire disclosure of which is hereby incorporated by reference.

TECHNICAL FIELD

The present disclosure relates to an apparatus and method for generating a network-on-chip (NoC) in an electronic device.

BACKGROUND

With a convergence of information technology (IT) devices and the trend of light, thin, short, and small devices, a system-on-chip (SoC) in which several high-quality IT devices are integrated on one chip is under development. In particular, among the techniques of implementing the SOC, an importance of a bus system for connecting several processing devices and for enabling mutual communication is gradually emerged. However, since a system integration level is increased and an information exchange amount between the processing devices is rapidly increased, a conventional shared bus structure is less frequently utilized than before in a high-quality SoC due to a bandwidth limit. In order to overcome the bandwidth limit and to facilitate a design of the high-quality SOC, a network-on-chip (NoC) technique is proposed.

Meanwhile, for a precise system-level power management, the NoC technique uses a voltage-frequency-island (VFI) scheme proposed to cluster cores using the same voltage-frequency into the same island among a plurality of cores.

However, when the NoC is constructed of heterogeneous cores having not only different voltages and frequencies but also different communication features, this scheme cannot construct the cores in a topological manner with a structure required for a power management.

In addition, when the heterogeneous cores are clustered in this manner, there is a problem in that it is difficult for the electronic device to provide an NoC with a desired size since the NoC is increased in size greater than a case of clustering homogenous cores.

SUMMARY

To address the above-discussed deficiencies, it is a primary object to provide a method of constructing heterogeneous cores in a topological manner with a structure required for a power management.

Various exemplary embodiments of the present disclosure may provide a network-on-chip (NoC) having a size desired by a vendor by minimizing a size of the NoC including heterogeneous cores.

According to an exemplary embodiment of the present disclosure, a method of generating an NoC in an electronic device includes clustering a plurality of cores based on total communication energy comprising first communication energy between a plurality of voltage-frequency-islands (VFIs) and second communication energy inside the VFIs.

According to an exemplary embodiment of the present disclosure, an apparatus for generating an NoC in an electronic device includes a display unit, and a controller for clustering a plurality of cores based on total communication energy comprising first communication energy between a plurality of VFIs and communication energy inside the VFIs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
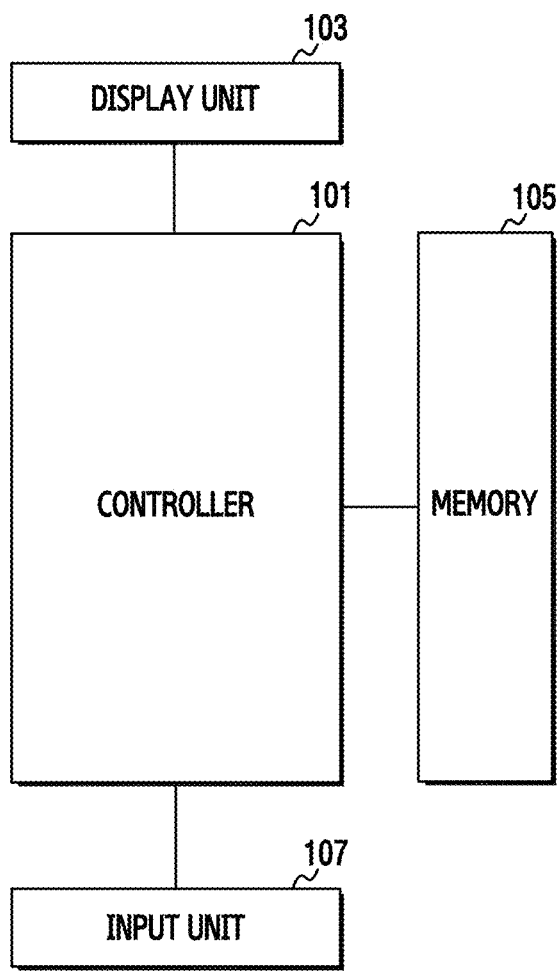
FIG. 1 is a block diagram of an electronic device according to an exemplary embodiment of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B," "at least one of A or/and B," or "one or more of A or/and B" may include all possible combinations of the items listed. For example, the expression "A or B," "at least one of A and B," or "at least one of A or B" refers to all of (1) including at least one A, (2) including at least one B, or (3) including all of at least one A and at least one B.

The expression "a first," "a second," "the first," or "the second" used in various embodiments of the present disclosure may modify various components regardless of the order and/or the importance but does not limit the corresponding components. For example, a first electronic device and a second electronic device may indicate different user devices, regardless of order or importance thereof. For example, a first element may be interchangeably referred to as a second element, and similarly, a second element may be interchangeably referred to as a first element without departing from the scope of the present disclosure.

It should be understood that when an element (e.g., a first element) is referred to as being (operatively or communicatively) "connected" or "coupled" to another element (e.g., second element), it may be directly connected or coupled directly to the other element. In such a situation, alternatively, any other element (e.g., third element) may be interposed between them. In certain embodiments, it may be understood that when an element (e.g., first element) is referred to as being "directly connected," or "directly coupled" to another element (second element), there are no element (e.g., third element) interposed between them (while there can be a connecting element, such as an adhesive or a connector between them).

The expression "configured to" used in the present disclosure may be interchangeably used with, for example, "suitable for," "having the capacity to," "designed to," "adapted to," "made to," or "capable of," depending on the context. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may, for example, include at least one of a television, a digital video disk (DVD) player, an audio player, a refrigerator, an air conditioner, a cleaner, an oven, a microwave oven, a washing machine, an air purifier, a set-top box, a home automation control panel, a TV box (e.g., HomeSync™ of Samsung, Apple TV™, or Google TV™), a game console (e.g., Xbox™, PalyStation™), an electronic dictionary, an electronic key, a camcorder, and an electronic frame.

According to another embodiment, the electronic device may include at least one of various medical devices (e.g., various portable medical measuring devices (a blood glucose measuring device, a heart rate measuring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Navigation Satellite System (GNSS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature-receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a block diagram of an electronic device according to an exemplary embodiment of the present disclosure.

Referring to FIG. 1, the electronic device may include a controller 101, a display unit 103, a memory 105, and an input unit 107. In a certain exemplary embodiment, the electronic device may omit at least one of components or may additionally include other components.

Each component will be described in detail. The input unit 107 may play a role of delivering a user input command to other components of the electronic device. For example, the input unit 107 may be constructed of various input elements such as a keyboard, a keypad, a mouse, a key button, or the like according to whether the electronic device is compatible. In addition, the input unit 107 may receive from a user the number of cores, a thickness and length of a bus line for inter-connecting the cores, and the number of ports of a router, and may output the received information to the controller 101.

The display unit 103 is constructed to provide various screen interfaces required to operate the electronic device. For example, the display unit 103 may include a liquid crystal display (LCD), a light emitting diode (LED) display, an organic light-emitting diode (OLED) display, a micro electro mechanical system (MEMS) display, or an electronic paper display. Further, the display unit 103 may display a variety of content (e.g., a text, an image, a video, an icon, a symbol, or the like). Furthermore, the display unit 103 may include a touch screen, and may detect a touch, gesture, proximity, or hovering input, for example, by using an electronic pen or a part of a user's body.

The memory 105 may include a volatile and/or non-volatile memory. For example, the memory 105 may store a command or data related to at least one different component of the electronic device. According to one exemplary embodiment, the memory 105 may store software and/or programs.

For example, the program may include a kernel, a middleware, an application programming interface (API), and/or an application program (or an application), or the like. At least one part of the kernel, the middleware, or the API may be referred to as an operating system (OS). For another example, the program may include a program for designing a network-on-chip (NoC).

The controller 101 may control a plurality of hardware or software components connected to the processor 210 by driving an operating system or an application program, and may process a variety of data and may perform an arithmetic operation. For example, the controller 101 may be implemented with a system-on-chip (SoC). According to one exemplary embodiment, the controller 101 may further include a graphic processing unit (GPU) and/or an image signal processor. The controller 101 may process an instruction or data, which is received from at least one of different components, for example, a non-volatile memory of the memory 109, by loading the instruction or data to a volatile memory of the memory 109 and may store a variety of data in the non-volatile memory.

In addition, the controller 101 may perform core clustering on the basis of a voltage-frequency-island (VFI) to generate the NoC. For example, the controller 101 may cluster cores on the basis of a communication energy between VFIs (hereinafter, an inter-VFI communication energy) and a communication energy inside the VFI (hereinafter, an intra-VFI communication energy). For example, the controller 101 may cluster the cores into a plurality of islands to minimize the inter-VFI communication energy.

In addition, the controller 101 may generate and dispose a network component on the basis of positions of the clustered cores. Herein, the network component may include a router and a network interface (NI). The router is disposed between the cores, and plays a role of delivering a packet which is input from one core to an intended specific core. The NI is generated between the core and the router, and plays a role of a path for delivering the packet. For example, the controller 101 may dispose the router on the basis of the number of ports of the router, which is input by the user.

In addition, the controller 101 may determine a VFI-based routing pass. Herein, the routing pass implies a link between one router and another router. For example, the controller 101 may allocate an inter-VFI routing pass on the basis of communication amounts of inter-VFI links to minimize the number of inter-VFI links.

For such an operation, the controller 101 may generate a topology in the NoC. Herein, the topology implies a connection between the core and the router in an on-chip interconnection network. In particular, the controller 101 may generate an NoC topology in a customized manner for a specific application processor (AP) by considering a communication energy between cores.

An operation of clustering cores on the basis of the VFI will be described in detail. The controller 101 may receive the number of ports of the router to be included in the NoC. Herein, the number of ports of the router may be determined by a user or may be pre-determined by a program. For another example, the controller 101 may receive not only the number of ports of the router but also at least one parameter (e.g., a thickness of a bus, the number of cores, the number of VFIs, or the like) required when the NoC is designed.

In addition, the controller 101 may calculate a voltage difference per VFI. Herein, the voltage difference per VFI implies a voltage difference between one VFI and another VFI. For example, the controller 101 may sort all cores in a descending order according to an applied voltage value, and thereafter may select a maximum voltage value and a minimum voltage value among the sorted applied voltage values. Further, the controller 101 may determine the voltage difference per VFI on the basis of the selected maximum voltage value and minimum voltage value and the number of VFIs.

For another example, the controller 101 may calculate the voltage difference per VFI by using equation (1) below.

$$\delta V = (V_H - V_L)/M \qquad (1)$$

Herein, $\delta V$ denotes a voltage difference per VFI, $V_H$ denotes a maximum voltage value of voltage applied to all cores, $V_L$ denotes a minimum voltage value of voltage applied to all cores, and M denotes the number of VFIs.

In addition, the controller 101 may cluster cores by the number of VFIs on the basis of the voltage difference per VFI and the number of VFIs and determine a voltage value for each VFI, and thereafter may proceed to operation 307. For example, the controller 101 may cluster the cores to satisfy equation (2) below.

$$V < k \times \delta V,$$
$$k = 1, \ldots M, \quad (2)$$

Herein, V denotes an applied voltage value of each core, δV denotes a voltage difference per VFI, and k denotes a VFI number. Further, a voltage unit may be millimeter volt (mV).

In addition, the controller 101 may calculate a 1st communication energy on the basis of the inter-VFI communication energy and the intra-VFI communication energy. Herein, the inter-VFI communication energy implies energy consumed in a communication between VFIs, and the intra-VFI communication energy implies energy consumed in a communication inside the VFI. Further, the 1st communication energy implies a total communication energy consumed by the NoC.

For example, the controller 101 may estimate the inter-VFI communication energy and the intra-VFI communication energy on the basis of energies consumed in a link, a router, and a buffer, and may estimate the 1st communication energy by summing the estimated inter-VFI communication energy and intra-VFI communication energy. The buffer may be, for example, a mixed clock first input first output buffer (hereinafter, mcFIFO), and the energies consumed in the link, the router, and the buffer may be pre-determined.

For another example, the controller 101 may calculate the 1st communication energy by using equation (3) below.

$$E_{total} = E_{inter} + E_{intra} \quad (3)$$

$$E_{inter} = \sum_{k=1}^{T} \left( E_{mcFIFO} \times n_k^{inter} + E_L \times \sum_{i=1}^{M} n_{i,k}^{intra} + E_R \times \sum_{i=1}^{M} (n_{i,k}^{intra} - 1) \right)$$

$$E_{intra} = \sum_{k=1}^{Z} \left( E_L \times \sum_{i=1}^{M} n_{i,k}^{intra} + E_R \times \sum_{i=1}^{M} (n_{i,k}^{intra} - 1) \right)$$

Herein, $E_{total}$ denotes total communication energy of the NoC, $E_{inter}$ denotes an inter-VFI communication energy, and $E_{intra}$ denotes an intra-VFI communication energy. In addition, $E_{mcFIFO}$ denotes consumption energy of mcFIFO, $E_L$ denotes consumption energy of a link, $E_R$ denotes consumption energy of a router, and an energy unit may be Joules (J). In addition, $n_k^{inter}$ denotes the number of inter-VFI links, and $n_{i,k}^{intra}$ denotes the number of intra-VFI links of an $i^{th}$ VFI related to a $k^{th}$ intra-VFI communication. In addition, M denotes the number of VFIs, T denotes the number of inter-VFI communications, and Z denotes the number of intra-VFI communications. In addition, each of i and k denotes a VFI number, and i and k may be equal to or different from each other.

The controller 101 may select one pair of cores having a maximum communication amount among cores for performing the inter-VFI communication. Herein, the communication amount may be measured as the number of bits per unit time. For example, the number of bits per unit time may be the number of bits per minute or the number of bits per second.

Figure 6:
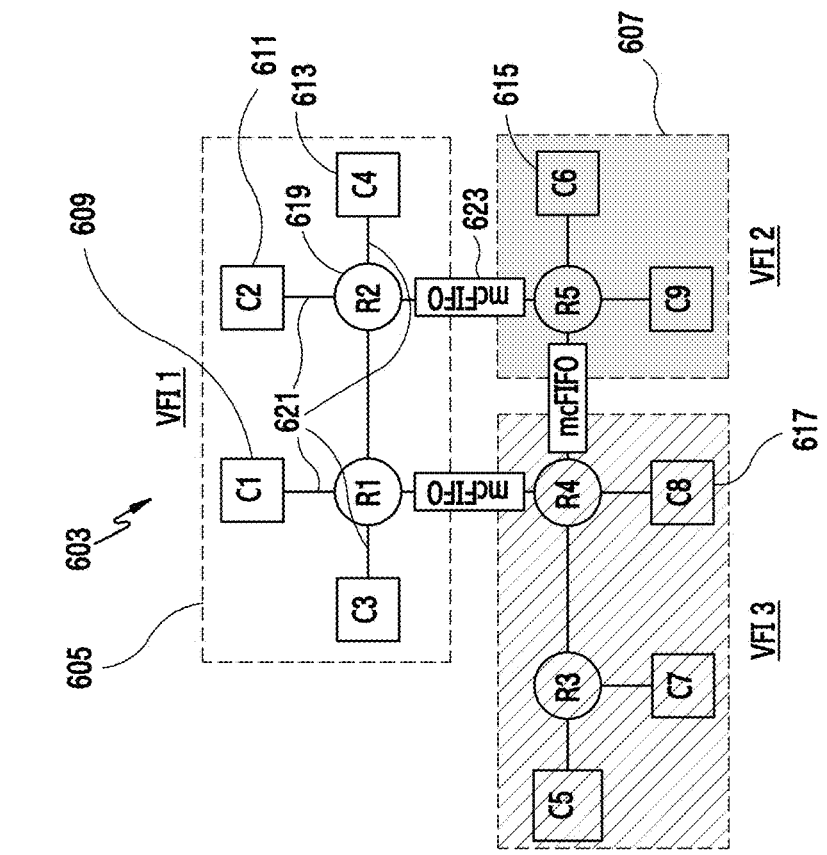
FIG. 6 illustrates an NoC generated in an electronic device according to an exemplary embodiment of the present disclosure.
Figure 6:
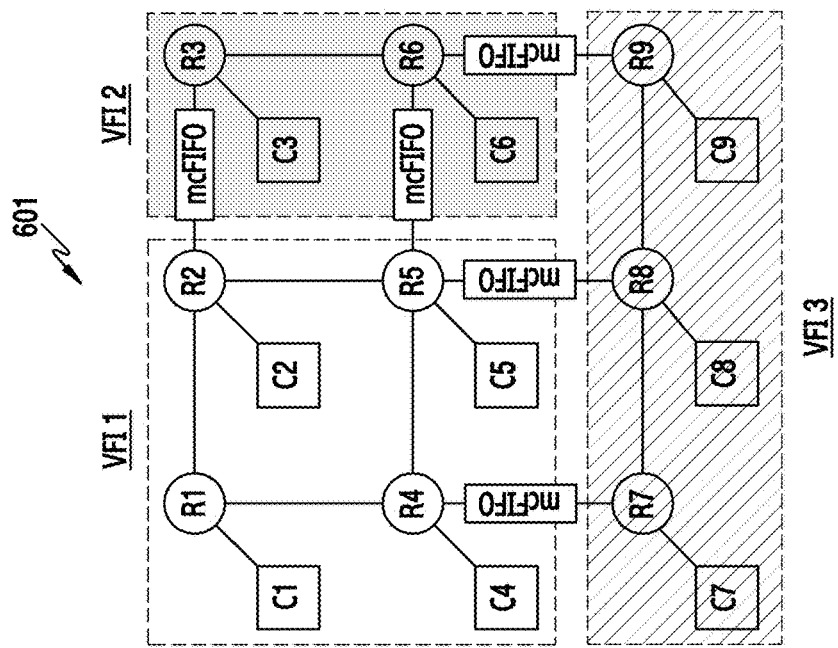

For example, as shown in FIG. 6, when an inter-VFI communication is performed in a 1st core 609 and an 8th core 617 as a first pair and a second core 611 and a 6th core 615 as a second pair, if a communication amount of the second pair is greater than that of the first pair, the controller 101 may select the second core 611 and the 6th core 615 of the second pair.

In addition, the controller 101 may move any one of the selected one pair of cores to a VFI including the other core. For example, upon selection of the second pair, the controller 101 may move the second core 611 to a second VFI 607 including the 6th core 615. For another example, the controller 101 may move the 6th core 615 to a first VFI 605 including the second core 611.

In addition, the controller 101 may calculate second communication energy on the basis of the inter-VFI communication energy and the intra-VFI communication energy. Herein, the second communication energy implies NoC's total communication energy measured after the core movement.

For example, the controller 101 may estimate the inter-VFI communication energy and the intra-VFI communication energy on the basis of energies consumed in a link, a router, and a buffer, and may estimate the second communication energy by summing the estimated inter-VFI communication energy and the intra-VFI communication energy. For another example, the controller 101 may estimate the second communication energy by using the aforementioned equation (3).

In addition, the controller 101 may compare the first communication energy and the second communication energy. If the first communication energy is less than the second communication energy as a result of the comparison, the controller 101 may restore a position of the moved core to an original position. For example, if the second core 611 included in the first VFI 605 is moved to the second VFI 607, the controller 101 may move the second core 611 to an original position, i.e., to the first VFI 605.

If the first communication energy exceeds the second communication energy, the controller 101 may fix the position of the moved core. For example, if the second core 611 included in the first VFI 605 is moved to the second VFI 607, the controller 101 may fix the position of the second core 611 to the second VFI 607.

As such, upon confirming the position of the core through the comparison result between the first communication energy and the second communication energy, the controller 101 may confirm whether the total communication energy is decreased on the basis of the first communication energy and the second communication energy. For example, if a difference between the first communication energy and the second communication energy exceeds a pre-determined first reference value, the controller 101 may determine that the total communication energy is decreased, and otherwise may determine that the total communication energy is not decreased.

For another example, the controller 101 may calculate a first energy difference between the previous first communication energy and the previous second communication energy, and may calculate second energy difference between current first communication energy and current second communication energy. Further, if a difference between the first energy difference and the second energy difference exceeds a pre-determined second reference value, the controller 101 may determine that the total communication energy is decreased, and otherwise may determine that the total communication energy is not decreased.

If it is determined that the total communication energy is decreased as a result of the confirmation, the controller 101 may repetitively perform an operation of calculating the total communication energy of the NoC. Unlike this, if it is determined that the total communication energy is not decreased, the controller 101 may end the VFI-based core clustering operation.

An operation of generating a network component will be described in detail. The controller 101 may dispose a router between one core and another core. For example, the controller 101 may generate the router on the basis of a pre-received or pre-determined value indicating the number of ports of the router, and may dispose the generated router.

In addition, for an intra-VFI communication optimization, the controller 101 may select one pair of cores having a maximum communication amount among cores for performing the intra-VFI communication for each VFI. Herein, the communication amount may be expressed by a data amount per unit time, and for example, may be the number of bits per second or the number of bits per minute.

For example, in FIG. 6, when a fourth core 613 communicates with each of the first core 609 and the second core 611, if a communication amount between the first core 609 and the fourth core 613 is greater than a communication amount between the first core 609 and the fourth core 613, the controller 101 may select the first core 609 and the fourth core 613.

In addition, the controller 101 may confirm whether there is a specific router having a plurality of ports connectable to selected one pair of cores in a corresponding VFI. For example, when the router has four ports, if two or more ports have already been connected to another core, the controller 101 may determine that the router cannot be connected to the selected one pair of cores. For another example, when one port has already been connected to another core, the controller 101 may determine that the router can be connected to the selected one pair of cores.

If there is a plurality of connectable ports as a result of the confirmation, the controller 101 may connect a plurality of ports of a specific router to the selected one pair of cores. For example, if the selected one pair of cores are second and fourth cores 611 and 613, as shown in FIG. 6, the controller 101 may connect a second router 619 to the second and fourth cores 611 and 613.

Unlike this, if the plurality of connectable ports is not present, the controller 101 may generate a new router and dispose the new router to a corresponding VFI, and may connect a plurality of ports of the new router to the selected one pair of cores.

After connecting the router to the cores, the controller 101 may confirm whether all cores in the NoC are connected to the router. If the all cores are not connected to the router as a result of the confirmation, the controller 101 may select one pair of cores until the all cores are connected to the router, and may repetitively perform an operation of connecting the selected cores to the router.

If the all cores are connected to the router, the controller 101 may generate NIs between the connected routers and cores. For example, the controller 101 may generate the NIs between at least one router and a plurality of cores connected to each other for each VFI.

For example, as shown in FIG. 6, if the first router is connected to the first core 609 and a third core and if the second router 619 is connected to the second and fourth cores 611 and 613, the controller 101 may generate NIs between the first core 609 and the first router, the third core and the first router, the second core 611 and the second router 619, and the fourth core 613 and the second router 619.

An operation of determining a routing pass based on the VFI will be described in detail. The controller 101 may search for inter-VFI links through which a minimum routing pass is possible for each inter-VFI. Herein, the minimum routing pass implies at least one routing pass having the minimum number of hops when one core communicates with another core among routing passes for providing a connection between VFIs. For example, the controller 101 may search for at least one link having the minimum number of hops among the inter-VFI links for each inter-VFI.

In addition, for each of found inter-VFI links, the controller 101 may increase the number of communications using a corresponding link. Herein, the number of communications corresponding to the respective links is referred to as a link.cnt.

In addition, the controller 101 may determine an inter-VFI link as the minimum routing pass on the basis of the number of communications among the inter-VFI links found for each inter-VFI. For example, the controller 101 may select an inter-VFI link having the maximum number of communications among the inter-VFI links for each inter-VFI.

In addition, the controller 101 may dispose mcFIFOs and voltage level converters (VLCs) on the basis of the determined inter-VFI link. Herein, the VLC, i.e., the voltage level converter, may receive power supplied from outside and may output the power by converting the power into rated voltage of cores included in the VFI.

For example, the controller 101 may generate the mcFIFOs and the VLCs by the determined number of inter-VFI links and then may dispose them on the inter-VFI links. For example, as shown in FIG. 6, the controller 101 may dispose an mcFIFO 623 and a VLC (not shown) together on a link between the second router 619 of the first VFI 605 and a 5th router (not shown) of the second VFI 607.

Figure 2:
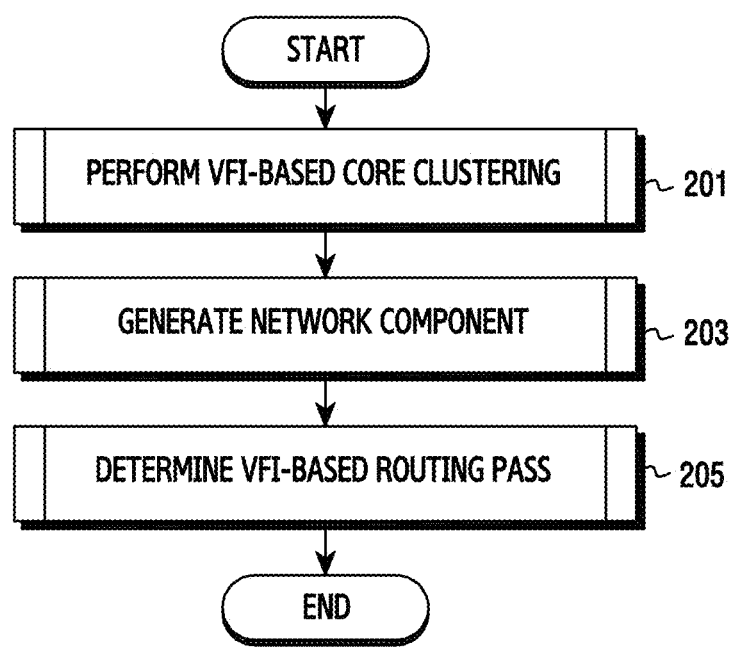
FIG. 2 is a flowchart for generating a network-on-chip (NoC) in an electronic device according to an exemplary embodiment of the present disclosure.

FIG. 2 is a flowchart for generating an NoC in an electronic device according to an exemplary embodiment of the present disclosure.

Referring to FIG. 2, in operation 201, the controller 101 may perform core clustering based on a VFI, and thereafter may proceed to operation 203. For example, the controller 101 may cluster cores on the basis of inter-VFI communication energy and an intra-VFI communication energy. For example, the controller 101 may cluster the cores into a plurality of islands to minimize the inter-VFI communication energy. The operation 201 will be described in detail with reference to FIG. 3.

In operation 203, the controller 101 may generate a network component on the basis of positions of the clustered cores, and thereafter may proceed to operation 205. Herein, the network component may include a router and an NI. The router is disposed between the cores, and plays a role of delivering a packet which is input from one core to an intended specific core. The NI is generated between the core and the router, and plays a role of a path for delivering the packet.

For example, the controller 101 may dispose the router on the basis of the number of ports of the router, which is input by the user. The operation 203 will be described in detail with reference to FIG. 4.

In operation 205, the controller 101 may determine a VFI-based routing pass. Herein, the routing pass implies a link between one router and another router. For example, the controller 101 may allocate an inter-VFI routing pass on the basis of communication amounts of inter-VFI links to minimize the number of inter-VFI links. The operation 205 will be described in detail with reference to FIG. 5.

For such an operation, the controller 101 may generate a topology in the NoC. Herein, the topology implies a connection between the core and the router in an on-chip interconnection network. In particular, the controller 101 may generate an NoC topology in a customized manner for a specific application processor (AP) by considering a communication energy between cores.

Figure 3:
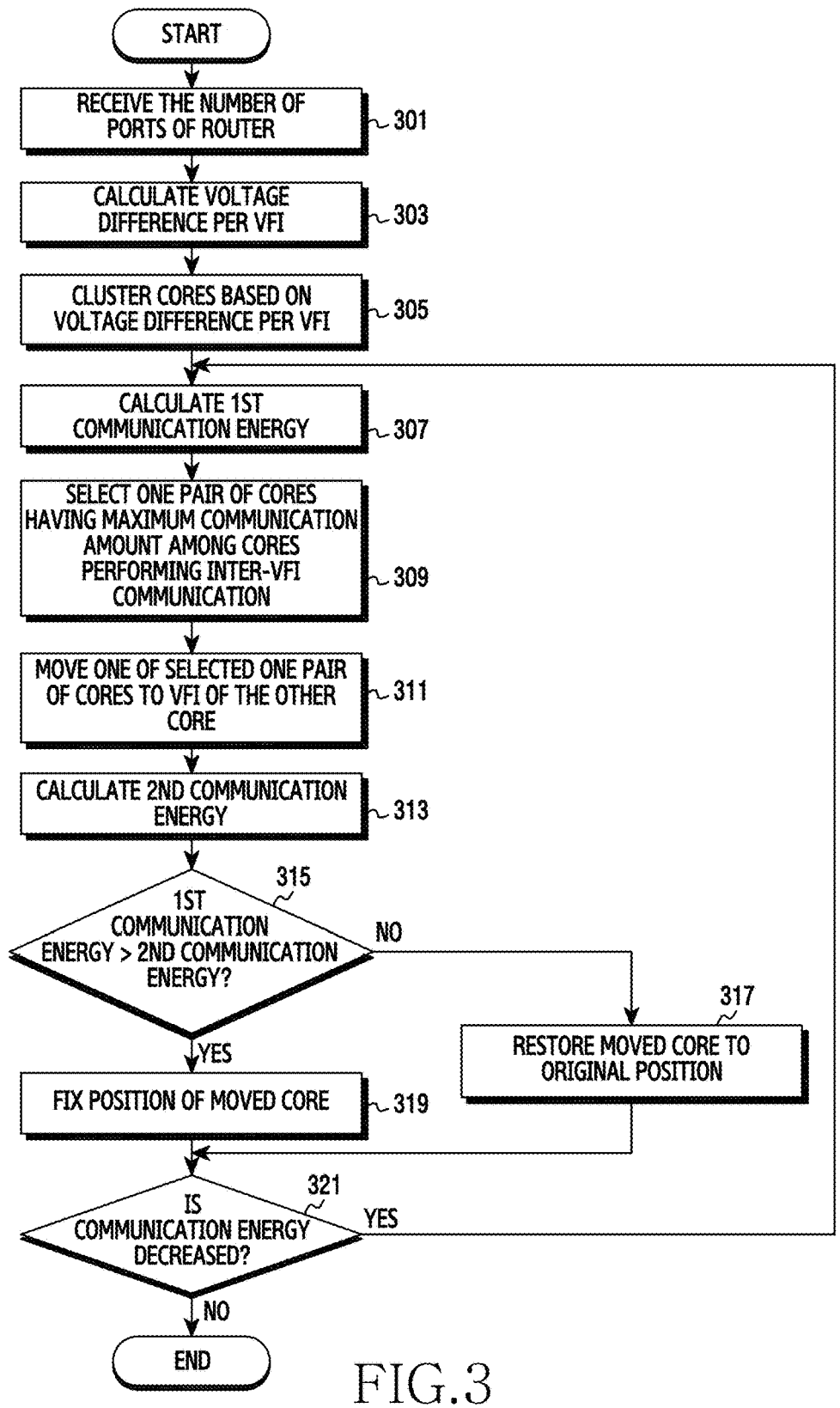
FIG. 3 is a flowchart for clustering cores on the basis of a voltage-frequency-island (VFI) in an electronic device according to an exemplary embodiment of the present disclosure.

FIG. 3 is a flowchart for clustering cores on the basis of a VFI in an electronic device according to an exemplary embodiment of the present disclosure.

Referring to FIG. 3, in operation 301, the controller 101 may receive the number of ports of a router to be generated in an NoC, and thereafter may proceed to operation 303. Herein, the number of ports of the router may be determined by a user or may be pre-determined by a program.

Figure 7:
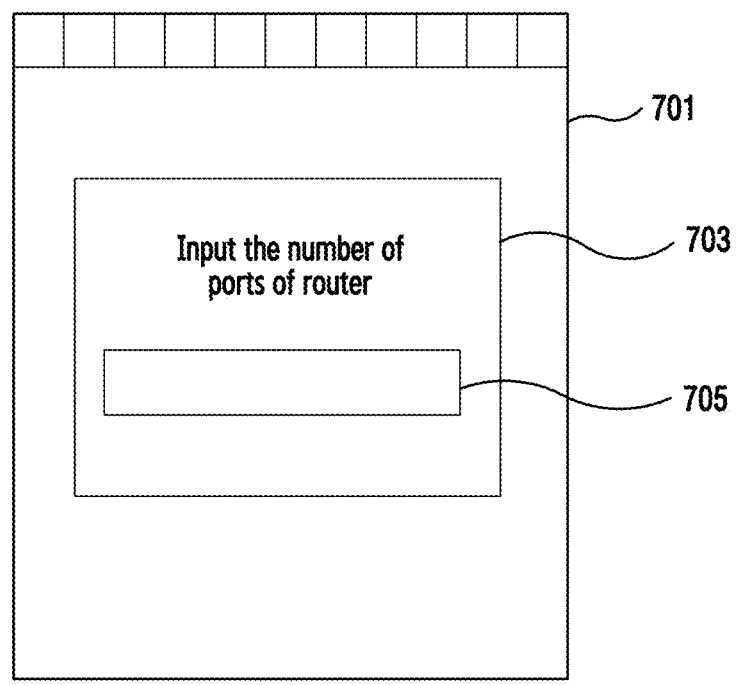
FIG. 7 is a view for requesting the number of ports of a router constituting an NoC in an electronic device according to an exemplary embodiment of the present disclosure.

For example, if the number of ports of the router is determined by the user, as shown in FIG. 7, the controller 101 may display a window 703 for requesting an input of the number of ports of the router on a screen 701, and may receive the number of ports of the router from the user through the displayed window 703. In this case, the controller 101 may display a window 705 for inputting the number of ports together with the window 703 for requesting the input of the number of ports.

For another example, the controller 101 may receive not only the number of ports of the router but also at least one parameter (e.g., a thickness of a bus, the number of cores, the number of VFIs, or the like) required when the NoC is designed.

In operation 303, the controller 101 may calculate a voltage difference per VFI, and thereafter may proceed to operation 305. Herein, the voltage difference per VFI implies a voltage difference between one VFI and another VFI.

For example, the controller 101 may sort all cores in a descending order according to an applied voltage value, and thereafter may select a maximum voltage value and a minimum voltage value among the sorted applied voltage values. Further, the controller 101 may determine the voltage difference per VFI on the basis of the selected maximum voltage value and minimum voltage value and the number of VFIs. For another example, the controller 101 may calculate the voltage difference per VFI by using equation (1).

In operation 305, the controller 101 may cluster cores by the number of VFIs on the basis of the voltage difference per VFI and the number of VFIs and may determine a voltage value for each VFI, and thereafter may proceed to operation 307. For example, the controller 101 may cluster the cores to satisfy equation (2).

In operation 307, the controller 101 may calculate first communication energy on the basis of the inter-VFI communication energy and the intra-VFI communication energy, and thereafter may proceed to operation 309. Herein, the inter-VFI communication energy implies energy consumed in communication between VFIs, and the intra-VFI communication energy implies energy consumed in communication inside the VFI. Further, the first communication energy implies a total communication energy consumed by the NoC.

For example, the controller 101 may estimate the inter-VFI communication energy and the intra-VFI communication energy on the basis of energies consumed in a link, a router, and a buffer, and may estimate the first communication energy by summing the estimated inter-VFI communication energy and intra-VFI communication energy. The buffer may be, for example, an mcFIFO buffer, and the energies consumed in the link, the router, and the buffer may be pre-determined.

For another example, the controller 101 may calculate the first communication energy by using equation (3).

In addition, the controller 101 may output the calculated first communication energy. For example, the controller 101 may display the calculated first communication energy through a communication energy display window 803. In this case, the controller 101 may display not only the first communication energy but also the inter-VFI communication energy and the intra-VFI communication energy together.

In operation 309, the controller 101 may select one pair of cores having a maximum communication amount among cores for performing the inter-VFI communication, and thereafter may proceed to operation 311. Herein, the communication amount may be measured as the number of bits per unit time. For example, the number of bits per unit time may be the number of bits per minute or the number of bits per second.

For example, as shown in FIG. 6, when an inter-VFI communication is performed in a first core 609 and an 8th core 617 as a first pair and a second core 611 and a 6th core 615 as a second pair, if a communication amount of the second pair is greater than that of the first pair, the controller 101 may select the second core 611 and the 6th core 615 of the second pair.

In operation 311, the controller 101 may move any one of the selected one pair of cores to a VFI including the other core, and thereafter may proceed to operation 313. For example, upon selection of the second pair, the controller 101 may move the second core 611 to a second VFI 607 including the 6th core 615. For another example, the controller 101 may move the 6th core 615 to a first VFI 605 including the second core 611.

In operation 313, the controller 101 may calculate second communication energy on the basis of the inter-VFI communication energy and the intra-VFI communication energy, and thereafter may proceed to operation 315. Herein, the second communication energy implies an NoC's total communication energy measured after the core movement.

For example, the controller 101 may estimate the inter-VFI communication energy and the intra-VFI communication energy on the basis of energies consumed in a link, a router, and a buffer, and may estimate the second communication energy by summing the estimated inter-VFI communication energy and the intra-VFI communication energy. For another example, the controller 101 may estimate the second communication energy by using the aforementioned equation (3).

In addition, the controller 101 may display the calculated second communication energy through the communication energy display window 803. In this case, the controller 101 may display not only the first communication energy but also the inter-VFI communication energy and the intra-VFI communication energy together.

In operation 315, the controller 101 may compare the first communication energy and the second communication energy. If the first communication energy exceeds the second communication energy as a result of the comparison, the controller 101 proceeds to operation 310, and otherwise may proceed to operation 317.

In case of proceeding to operation 317, the controller 101 may restore a position of the moved core to an original position, and thereafter may proceed to operation 321. For example, if the second core 611 included in the first VFI 605 is moved to the second VFI 607, the controller 101 may move the second core 611 to an original position, i.e., to the first VFI 605.

In case of proceeding to operation 319, the controller 101 may fix the position of the moved core, and thereafter may proceed to operation 321. For example, if the second core 611 included in the first VFI 605 is moved to the second VFI 607, the controller 101 may fix the position of the second core 611 to the second VFI 607.

In operation 321, the controller 101 may confirm whether the total communication energy is decreased on the basis of the first communication energy and the second communication energy. For example, if a difference between the first communication energy and the second communication energy exceeds a pre-determined first reference value, the controller 101 may determine that the total communication energy is decreased, and otherwise may determine that the total communication energy is not decreased.

For another example, the controller 101 may calculate a first energy difference between the previous first communication energy and the previous second communication energy, and may calculate a second energy difference between current first communication energy and current second communication energy. Further, if a difference between the first energy difference and the second energy difference exceeds a pre-determined second reference value, the controller 101 may determine that the total communication energy is decreased, and otherwise may determine that the total communication energy is not decreased.

If it is determined that the total communication energy is decreased as a result of the confirmation, the controller 101 may repetitively perform operation 307. Unlike this, if it is determined that the total communication energy is not decreased, the controller 101 may end the VFI-based core clustering operation.

From an NoC design aspect, since a design cost for the inter-VFI is greater than a design cost for the intra-VFI, it is important to design the NoC to minimize a communication amount of the inter-VFI. The electronic device may switch the inter-VFI communication to the intra-VFI communication by moving one of one pair of cores for performing the inter-VFI communication through operations 301 to 321 of FIG. 3. In doing so, the electronic device may decrease the communication amount of the inter-VFI to minimize a design cost of the NoC.

Figure 4:
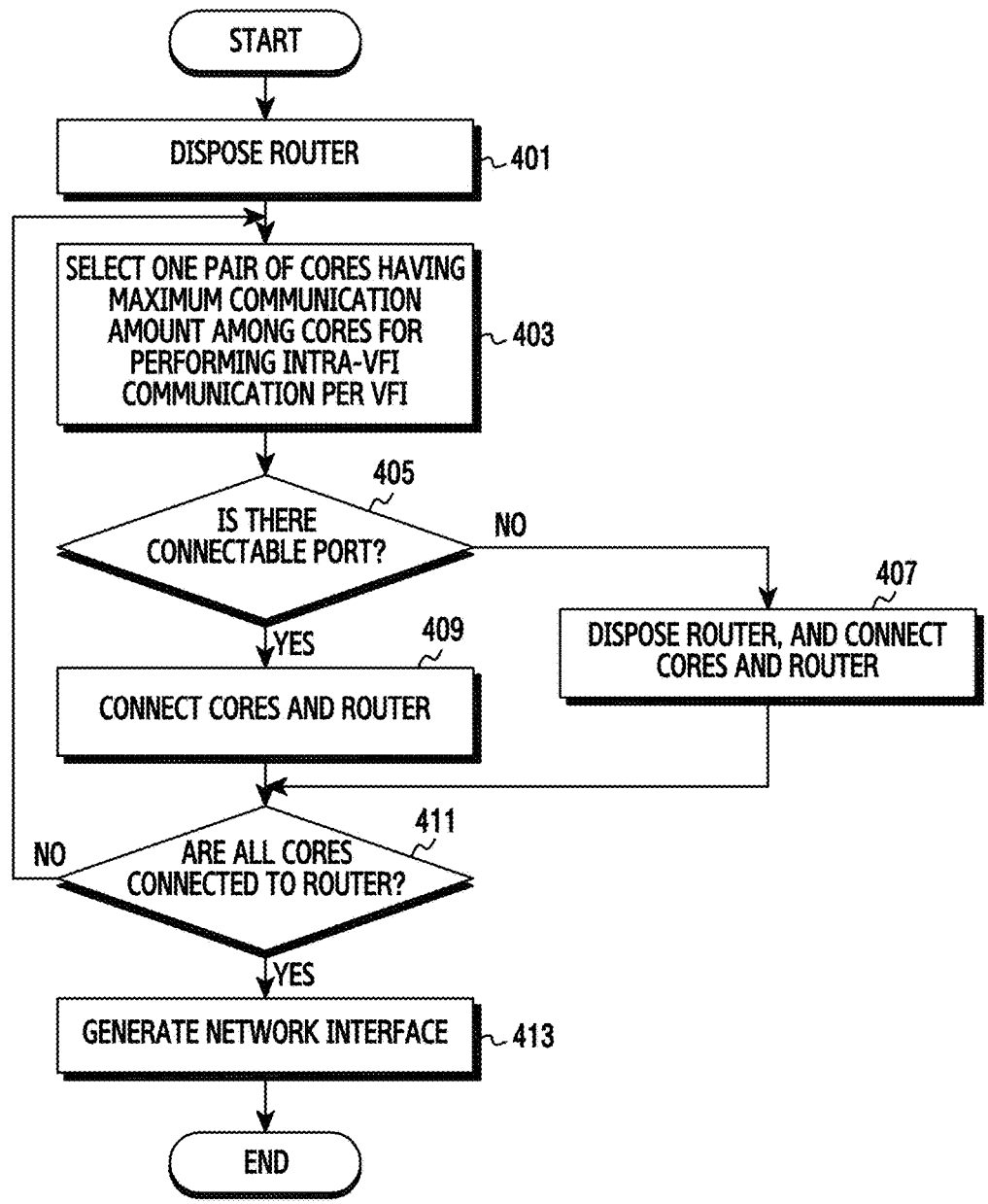
FIG. 4 is a flowchart for generating a network component in an electronic device according to an exemplary embodiment of the present disclosure.

FIG. 4 is a flowchart for generating a network component in an electronic device according to an exemplary embodiment of the present disclosure.

Referring to FIG. 4, in operation 401, the controller 101 may dispose a router between one core and another core, and thereafter may proceed to operation 403. For example, the controller 101 may generate the router on the basis of a pre-received or pre-determined value indicating the number of ports of the router, and may dispose the generated router.

In operation 403, for an intra-VFI communication optimization, the controller 101 may select one pair of cores having a maximum communication amount among cores for performing the intra-VFI communication for each VFI. Herein, the communication amount may be expressed by a data amount per unit time, and for example, may be the number of bits per second or the number of bits per minute.

For example, in FIG. 6, when a fourth core 613 communicates with each of the first core 609 and the second core 611, if a communication amount between the first core 609 and the fourth core 613 is greater than a communication amount between the first core 609 and the fourth core 613, the controller 101 may select the first core 609 and the fourth core 613.

In operation 405, the controller 101 may confirm whether there is a specific router having a plurality of ports connectable to the selected one pair of cores in a corresponding VFI. For example, when the router has four ports, if two or more ports have already been connected to another core, the controller 101 may determine that the router cannot be connected to the selected one pair of cores. For another example, when one port has already been connected to another core, the controller 101 may determine that the router can be connected to the selected one pair of cores.

If there is a plurality of ports as a result of the confirmation, the controller 101 may proceed to operation 409, and otherwise may proceed to operation 407.

In case of proceeding to operation 407, the controller 101 may generate a new router and dispose the new router to a corresponding VFI, may connect a plurality of ports of the new router to selected one pair of cores, and thereafter may proceed to operation 411.

In case of proceeding to operation 409, the controller 101 may connect a plurality of ports of a specific router to the selected one pair of cores, and thereafter may proceed to operation 411. For example, if the selected one pair of cores are second and fourth cores 611 and 613, as shown in FIG. 6, the controller 101 may connect a second router 619 to the second and fourth cores 611 and 613.

In operation 411, the controller 101 may confirm whether all cores in the NoC are connected to the router.

If the all cores are connected to the router as a result of the confirmation, the controller 101 may proceed to operation 413, and otherwise may repetitively perform operation 403.

In case of proceeding to operation 413, the controller 101 may generate NIs between the connected routers and cores. For example, the controller 101 may generate the NIs between at least one router and a plurality of cores connected to each other for each VFI.

For example, as shown in FIG. 6, if the first router is connected to the first core 609 and a third core and if the second router 619 is connected to the second and fourth cores 611 and 613, the controller 101 may generate NIs between the first core 609 and the first router, the third core and the first router, the second core 611 and the second router 619, and the fourth core 613 and the second router 619.

As such, the electronic device may connect the plurality of cores and at least one router by considering the number of ports of the router through operations 401 to 413 of FIG. 4. Further, the electronic device may connect the plurality of cores and the at least one router by considering an intra-VFI communication amount for each VFI. Through such a connection operation, the number of routers generated by the electronic device is minimized, thereby minimizing a size of the NoC.

Figure 5:
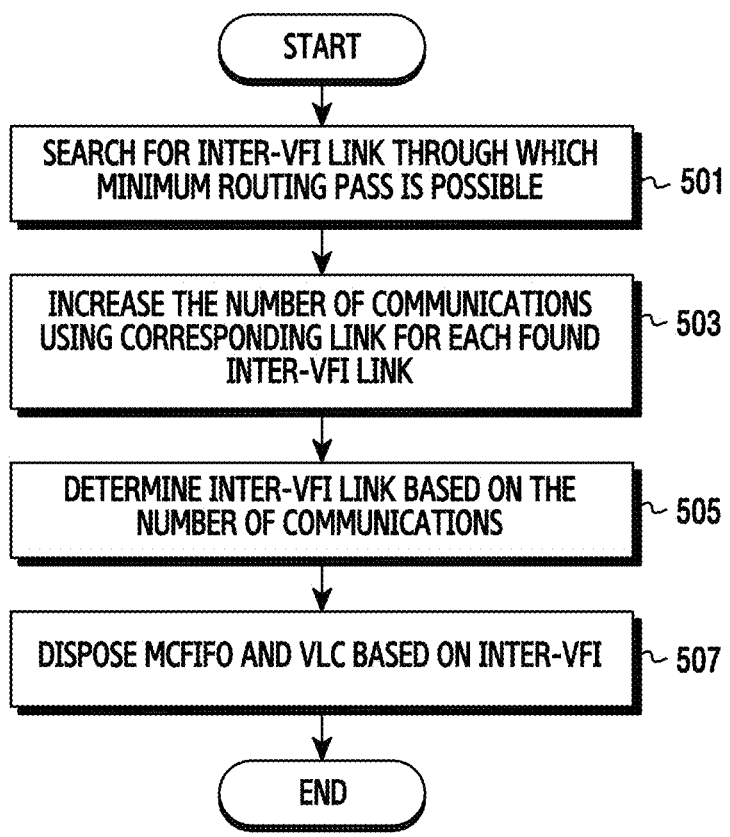
FIG. 5 is a flowchart for determining a routing pass on the basis of a VFI in an electronic device according to an exemplary embodiment of the present disclosure.

FIG. 5 is a flowchart for determining a routing pass on the basis of a VFI in an electronic device according to an exemplary embodiment of the present disclosure.

Referring to FIG. 5, in operation 501, the controller 101 may search for inter-VFI links through which a minimum routing pass is possible for each inter-VFI, and thereafter may proceed to operation 503. Herein, the minimum routing pass implies at least one routing pass having the minimum number of hops when one core communicates with another core among routing passes for providing a connection between VFIs. For example, the controller 101 may search for at least one link having the minimum number of hops among the inter-VFI links for each inter-VFI.

In operation 503, for each of found inter-VFI links, the controller 101 may increase the number of communications using a corresponding link, and thereafter may proceed to operation 505.

In operation 505, the controller 101 may determine an inter-VFI link as the minimum routing pass on the basis of the number of communications among the inter-VFI links found for each inter-VFI, and thereafter may proceed to operation 507. For example, the controller 101 may select an inter-VFI link having the maximum number of communications among the inter-VFI links for each inter-VFI.

In operation 507, the controller 101 may dispose mcFIFOs and VLCs on the basis of the determined inter-VFI link. Herein, the VLC, i.e., the voltage level converter, may receive power supplied from outside and may output the power by converting the power into rated voltage of cores included in the VFI. Meanwhile, the mcFIFO and the VLC may be collectively referred to as a network component.

For example, the controller 101 may generate the mcFIFOs and the VLCs by the determined number of inter-VFI links and then may dispose them on the inter-VFI links. For example, as shown in FIG. 6, the controller 101 may dispose an mcFIFO 623 and a VLC (not shown) together on a link between the second router 619 of the first VFI 605 and a 5th router (not shown) of the second VFI 607.

As such, the electronic device may minimize the number of inter-VFI links through operations 501 to 507 of FIG. 5, thereby decreasing total communication energy of the NoC. Further, the electronic device may minimize the number of inter-VFI links, thereby minimizing the size of the NoC.

FIG. 6 illustrates an NoC generated in an electronic device according to an exemplary embodiment of the present disclosure.

Referring to FIG. 6, a first topology 601 is a view obtained by clustering several different types of cores (hereinafter, heterogeneous cores) through the conventional formal topology, and a second topology 603 is a view obtained by clustering heterogeneous cores through a customized topology proposed in the present disclosure.

Herein, the customized topology uses an asymmetric feature of a communication traffic pattern related to a heterogeneous multi-core SoC.

The customized topology may decrease the number of routers, the number of mcFIFOs, and the number of VLCs in comparison with the first topology 601, and thus may minimize a size of an NoC to minimize a design cost of the NoC. Further, the customized topology may minimize the size of the NoC to decrease power consumption of the NoC.

FIG. 7 is a view for requesting the number of ports of a router constituting an NoC in an electronic device according to an exemplary embodiment of the present disclosure.

Referring to FIG. 7, the controller 101 may display a window 705 for inputting the number of ports together with a window 703 for requesting an input of the number of ports of a router on a screen 701 of the electronic device.

Although it is described in one exemplary embodiment that the controller 101 displays the window 703 for requesting the input of the number of ports while performing operation 201 of clustering the cores based on the VFI, the present disclosure is not limited thereto. For example, the controller 101 may display the window 703 for requesting the input of the number of ports while performing operation 203 of generating the network component.

Figure 8:
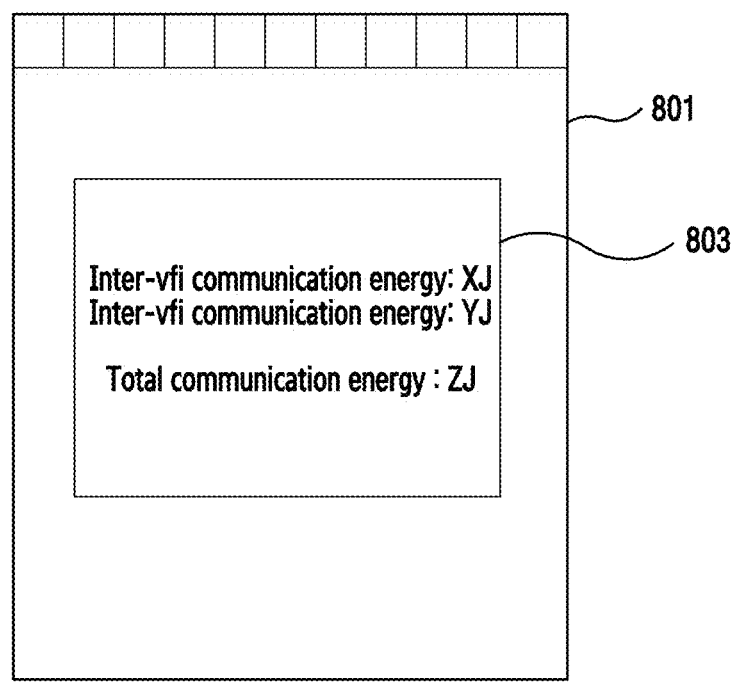
FIG. 8 is a view for displaying communication energy of an NoC in an electronic device according to an exemplary embodiment of the present disclosure.

FIG. 8 is a view for displaying communication energy of an NoC in an electronic device according to an exemplary embodiment of the present disclosure.

Referring to FIG. 8, the controller 101 may calculate total communication energy of the NoC, and may display a communication energy display window 803 including a value of the calculated total communication energy on a screen 801. In this case, the controller 101 may display not only the total communication energy but also inter-VFI communication energy and an intra-VFI communication energy.

For example, in operation 307, the controller 101 may calculate the first communication energy, and thereafter may display the calculated first communication energy through the communication energy display window 803. For another example, in operation 313, the controller 101 may calculate the second communication energy, and thereafter may display the calculated second communication energy through the communication energy display window 803.

According to various exemplary embodiments of the present disclosure, an apparatus and method for generating an NoC in an electronic device are provided to construct heterogeneous cores in a topological manner with a structure required for a power management.

In addition, according to various exemplary embodiments of the present disclosure, an apparatus and method for generating an NoC in an electronic device are provided to minimize a size of the NoC including heterogeneous cores.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of generating a network-on-chip (NoC) in an electronic device, the method comprising:
    clustering a plurality of cores based on total communication energy comprising first communication energy among a plurality of voltage-frequency-islands (VFIs) and second communication energy inside the plurality of VFIs;
    generating at least one router based on a pre-determined value corresponding to a number of ports of the at least one router;
    selecting one pair of cores having a maximum number of communications among the plurality of cores for performing a communication inside the plurality of VFIs; and
    connecting the selected one pair of cores to one of the at least one router.

2. The method of claim 1, wherein clustering the plurality of cores comprises:
    selecting one pair of cores having a maximum number of communications among the plurality of cores for performing a communication among the plurality of VFIs;
    moving one of the selected one pair of cores to the plurality of VFIs of the plurality of cores that is not selected; and
    fixing a position of the moved one core according to a comparison result between a first total communication energy before the movement of the one of the selected one pair of cores and a second total communication energy after the movement of the one of the selected one pair of cores.

3. The method of claim 2, wherein fixing the position of the moved one core comprises:
    fixing the position of the moved one core if the first total communication energy exceeds the second total communication energy; and
    restoring the position of the moved one core to an original position of the moved one core if the first total communication energy is less than or equal to the second total communication energy.

4. The method of claim 1, wherein the pre-determined value corresponding to the number of ports of the at least one router is determined by a user.

5. The method of claim 1, wherein connecting the selected one pair of cores comprises:
generating and disposing a new router if the at least one router is not capable of simultaneously connecting the selected one pair of cores; and
connecting the selected one pair of cores to the new router.

6. The method of claim 1, further comprising:
determining at least one minimum routing pass among all routing passes based on a number of hops of the plurality of cores for performing a communication among the plurality of VFIs; and
disposing a network component on the at least one minimum routing pass.

7. The method of claim 6, wherein determining the at least one minimum routing pass comprises:
searching for all links among the plurality of VFIs; and
determining at least one link having a maximum number of communications among the searched all links as the at least one minimum routing pass.

8. The method of claim 1, further comprising displaying the total communication energy.

9. An apparatus for generating a network-on-chip (NoC) in an electronic device, the apparatus comprising:
a display unit; and
a controller configured to:
cluster a plurality of cores based on total communication energy comprising first communication energy among a plurality of voltage-frequency-islands (VFIs) and second communication energy inside the plurality of VFIs;
generate at least one router based on a pre-determined value corresponding to a number of ports of the at least one router; and
select one pair of cores having a maximum number of communications among the plurality of cores for performing a communication inside the plurality of VFIs; and
connect the selected one pair of cores to one of the at least one router.

10. The apparatus of claim 9, wherein the controller is further configured to:
select one pair of cores having a maximum number of communications among the plurality of cores for performing a communication among the plurality of VFIs;
move one of the selected one pair of cores to the plurality of VFIs of the plurality of cores that is not selected; and
fix a position of the moved one core according to a comparison result between a first total communication energy before the movement of the one of the selected one pair of cores and a second total communication energy after the movement of the one of the selected one pair of cores.

11. The apparatus of claim 10, wherein the controller is further configured to:
fix the position of the moved one core if the first total communication energy exceeds the second total communication energy; and
restore the position of the moved one core to an original position of the moved one core if the first total communication energy is less than or equal to the second total communication energy.

12. The apparatus of claim 9, wherein the pre-determined value corresponding to the number of ports of the at least one router is determined by a user.

13. The apparatus of claim 9, wherein the controller is further configured to:
generate and dispose a new router if the at least one router is not capable of simultaneously connecting the selected one pair of cores; and
connect the selected one pair of cores to the new router.

14. The apparatus of claim 9, wherein the controller is further configured to:
determine at least one minimum routing pass among all routing passes based on a number of hops of the plurality of cores for performing a communication among the plurality of VFIs; and
dispose a network component on the at least one minimum routing pass.

15. The apparatus of claim 14, wherein the controller is further configured to:
search for all links among the plurality of VFIs; and
determine at least one link having a maximum number of communications among the searched all links as the at least one minimum routing pass.

16. The apparatus of claim 9, wherein the controller is further configured to display the total communication energy on the display unit.

* * * * *